(12) United States Patent
Ramesh et al.

(10) Patent No.: US 10,843,873 B1
(45) Date of Patent: Nov. 24, 2020

(54) CONVEYOR APPARATUS (71) Applicant: FLSmidth A/S, Valby (DK)

(72) Inventors: Ragupathy Ramesh, Virudhunagar (IN); Suresh Thailan, Virdhachalam Taluk (IN)

(73) Assignee: FLSmidth A/S

( * ) Notice: Subject to any disclaimer, the term of this patent is extended or adjusted under 35 U.S.C. 154(b) by 0 days.

(21) Appl. No.: 16/764,435

(22) PCT Filed: Nov. 15, 2018

(86) PCT No.: PCT/IB2018/059016
§ 371 (c)(1),
(2) Date: May 15, 2020

(87) PCT Pub. No.: WO2019/097455
PCT Pub. Date: May 23, 2019

(30) Foreign Application Priority Data

Nov. 15, 2017 (DK) .................................. 2017 70861

(51) Int. Cl.
*B65G 39/16* (2006.01)
*B65G 15/08* (2006.01)
*B65G 15/64* (2006.01)
*B65G 43/02* (2006.01)

(52) U.S. Cl.
CPC ............. *B65G 39/16* (2013.01); *B65G 15/08* (2013.01); *B65G 15/64* (2013.01); *B65G 43/02* (2013.01); *B65G 2201/047* (2013.01); *B65G 2203/0275* (2013.01); *B65G 2203/042* (2013.01)

(58) Field of Classification Search
CPC ........ B65G 15/08; B65G 39/16; B65G 15/64; B65G 43/02; B65G 2201/047; B65G 2203/0275

USPC .......................................................... 198/819
See application file for complete search history.

(56) References Cited

U.S. PATENT DOCUMENTS 4,402,395 A * 9/1983 Hashimoto ............ B65G 15/08
198/807
5,161,675 A 11/1992 Engst et al.
8,033,385 B2 * 10/2011 Brewka ................ B65G 39/125
198/819

FOREIGN PATENT DOCUMENTS

| CN | 103253493 A * | 8/2013 |
| CN | 103253493 A | 8/2013 |
| DE | 1028043 B | 4/1958 |
| JP | 08277010 A | 10/1996 |

(Continued)

OTHER PUBLICATIONS

International Search Report and Written Opinion dated Feb. 26, 2019, 17 pages.

*Primary Examiner* — Gene O Crawford
*Assistant Examiner* — Lester III Rushin
(74) *Attorney, Agent, or Firm* — Jeffrey A. Sharp (57) ABSTRACT

A conveyor apparatus (1) can include a control mechanism to permit automatic monitoring of a conveyor belt (7) and automatically actuate adjustment of the belt (7). In some embodiments, at least two sensors (31) can be utilized to detect an operational condition of the belt (7) indicating an undesirable alignment of the belt as the belt moves to convey material. Upon such a detected operational condition, a control mechanism can automatically actuate adjustment of at least one belt support device to adjust motion of the belt (7) in response to the detected operational condition.

6 Claims, 8 Drawing Sheets

(56) References Cited

FOREIGN PATENT DOCUMENTS

JP  09100014 A  4/1997

* cited by examiner

CONVEYOR APPARATUS

FIELD OF INVENTION

The present innovation relates to material conveying apparatuses. For example, the present innovation relates to the conveying of material (e.g. ore, rock, minerals, comminuted material, etc.), conveying devices such as, for example, pipe conveyors, mechanisms for controlling and/or adjusting operation of conveyor devices, kits for upgrading conveyor apparatuses, and methods of making and using the same.

BACKGROUND

Conveyor devices can include devices that utilize a continuous belt to convey material between different locations. Examples of conveyor devices can be appreciated from U.S. Pat. Nos. 8,610,008, 8,177,055, 8,177,054, 8,033,385, 6,155,400, 6,079,551, 5,222,594, 5,163,663, and 5,090,549, U.S. Pat. App. Pub. Nos. 2012/0251246 and 2012/0247915, and Chinese Utility Model Patents CN 204223727 U and CN 205471349 U. Belt alignment issues can affect material conveying operations. For example, if a conveyor belt becomes misaligned, material may be lost as it is conveyed via the belt. In some circumstances, such belt alignment issues can be difficult to address. Often, the conveyor has to be shut down so that the belt can be properly aligned. This can incur a substantial cost in terms of lost operational time in addition to the time and costs associated with realigning the belt.

SUMMARY

We have determined that a new conveyor belt apparatus and a new control mechanism for conveyor belt apparatuses can be utilized to improve conveyor apparatus operations to reduce operational down times relating to belt alignment issues. We have also developed a new methodology that can be employed for monitoring operation of a conveyor apparatus and adjusting operations of the conveyor device to improve conveyor apparatus performance and reduce operational down times relating to belt alignment issues.

Particularly disclosed, is a conveyor apparatus (1) comprising a moveable belt (7) supported by a frame (9). The moveable belt is preferably moveable between a material loading end and material discharge end, and has an upper run (7a) and a lower run (7b). The frame may comprise upper frame segments (9e) connected to lower frame segments (9f), without limitation.

In some embodiments, the frame may comprise a plurality of sensors (31) connected to upper frame segments (9e) of the frame (9) to detect a rotation of an overlap portion (7e) of the belt from a top central position to a second position that is at least 30° from the top central position as it is moved to convey material in a pipe configuration that defines a channel (7h) in which the material (21) being conveyed by the belt is held. In some embodiments, the frame may comprise slideable connection mechanisms (17) moveably connecting the upper frame segments (9e) to the lower frame segments (9f). In some embodiments, the frame may comprise pivotal connection mechanisms (19) pivotally connecting the upper frame segments (9e) to an upper peripheral portion (9m) of the frame, without limitation.

Some embodiments of the conveyor apparatus (1) may include the sensors (31), the slideable connection mechanisms (17), and the pivotal connection mechanisms (19), without limitation. In some embodiments, the conveyor apparatus may include the plurality of sensors (31). In some embodiments, the conveyor apparatus (1) includes one of: the slideable connection mechanisms (17) moveably connecting the upper frame segments (9e) to the lower frame segments (9f); and pivotal connection mechanisms (19) pivotally connecting the upper frame segments (9e) to an upper peripheral portion (9m) of the frame. In some embodiments, the conveyor apparatus (1) includes both of: the slideable connection mechanisms (17) moveably connecting the upper frame segments (9e) to the lower frame segments (9f); and pivotal connection mechanisms (19) pivotally connecting the upper frame segments (9e) to an upper peripheral portion (9m) of the frame, without limitation.

The conveyor apparatus may comprise a controller (11) having non-transitory memory (11b) communicatively connected to a processor (11a), the controller (11) communicatively connected to the sensors (31) to receive sensor data from the sensors (31). The controller may be configured to determine, from the sensor data, that the overlap portion (7e) of a middle segment (7d) of the upper run (7a) of the belt (7) has rotated away from the top central position such that rotation of the overlap portion (7e) meets a first pre-selected rotational threshold, without limitation. The controller (11) may be configured to initiate actuation of at least one actuator (17a) in response to determining that the overlap portion (7e) has rotated such that the first pre-selected rotational threshold is met or exceeded. In this regard, at least one upper frame segment moves relative to the lower frame segment to which the upper frame segment is connected via slideable connection mechanisms (17) and the pivotal connection mechanism (19) to induce the overlap portion to rotate back toward the top central position as the belt moves to convey material, without limitation.

The conveyor apparatus may comprise a controller (11) having non-transitory memory (11b) communicatively connected to a processor (11a), the controller (11) communicatively connected to the sensors (31) to receive sensor data from the sensors (31), the controller configured to determine, from the sensor data, that the overlap portion (7e) of a middle segment (7d) of the upper run (7a) of the belt (7) has rotated away from the top central position such that rotation of the overlap portion (7e) meets a first pre-selected rotational threshold, without limitation.

The controller (11) of the conveyor apparatus may be configured to initiate actuation of at least one actuator (17a) in response to determining that the overlap portion (7e) has rotated such that the first pre-selected rotational threshold is met or exceeded so that at least one upper frame segment moves relative to the lower frame segment to which the upper frame segment is connected via slideable connection mechanisms (17) and the pivotal connection mechanism (19) to induce the overlap portion to rotate back toward the top central position as the belt moves to convey material, without limitation.

Actuators may be provided to the conveyor apparatus to actuate motion of the upper frame segments relative to the lower frame segments via at least one of the slideable connection mechanisms (17) and the pivotal connection mechanisms (19), without limitation. Each of the upper frame segments may have a plurality of idlers positioned to define an aperture through which the belt 7 is passable when the belt is in the pipe configuration such that an external side (7g) of the belt (7) is contacted by the idlers as the belt passes through the aperture, without limitation.

A method of operating a conveyor apparatus (1) is further disclosed. The method may include the use of a conveyor apparatus (1) as hereforeto described; for example, a conveyor apparatus (1) comprising: a moveable belt (7) supported by a frame (9), the moveable belt (7) moveable between a material loading end and material discharge end, the moveable belt having an upper run (7a) and a lower run (7b); and the frame (9) comprising upper frame segments (9e) connected to lower frame segments (9f), without limitation. The method may involve the step of a plurality of sensors (31) monitoring an overlap portion (7e) of a middle segment (7d) of an upper run (7a) of a belt (7) as the belt (7) moves in a pipe configuration to convey material. The method may also involve the step of detecting the overlap portion (7e) rotating during motion of the belt to convey material such that a first pre-selected rotational threshold is met that indicates the overlap portion has rotated too far away from a top central position via sensor data received from the sensors (31). In response to detecting the first pre-selected rotational threshold is met, at least one of the following steps may be performed: (i) communicating at least one warning; and (ii) initiating motion of upper frame segments (9e) of the frame (9) relative to lower frame segments (9f) of the frame (9) to induce rotation of the overlap portion (7e) toward the top central position as the belt (7) is moved to convey material, without limitation. In some embodiments, both of the aforementioned steps of (i) communicating the at least one warning; and (ii) initiating motion of the upper frame segments (9e) of the frame (9) relative to lower frame segments (9f) of the frame (9) may be performed, without limitation. In some embodiments, the step of initiating of motion of the upper frame segments (9e) of the frame (9) relative to the lower frame segments (9f) of the frame (9) to induce rotation of the overlap portion (7e) toward the top central position as the belt (7) is moved to convey material may be performed in response to detecting the first pre-selection rotational threshold is met or exceeded.

In some embodiments, the motion of the upper frame segments (9e) of the frame (9) relative to the lower frame segments (9f) of the frame (9) to induce rotation of the overlap portion (7e) toward the top central position as the belt (7) is moved to convey material may comprise upper frame segments moving relative to lower frame segments via slideable connection mechanisms moveably connecting the upper frame segments to the lower frame segments, without limitation. The motion of the upper frame segments (9e) of the frame (9) relative to the lower frame segments (9f) of the frame (9) to induce rotation of the overlap portion (7e) toward the top central position as the belt (7) is moved to convey material may comprise upper frame segments rotating via pivotal connection mechanisms (19) rotatably connecting the upper frame segments to the a peripheral upper portion of the frame (9), without limitation.

According to some embodiments, an "upgrade kit" may be provided for a conveyor apparatus (1) to improve its function. The upgrade kit may comprise a plurality of sensors (31) connectable to upper frame segments (9e) of a frame (9) to detect a rotation of an overlap portion (7e) of a belt supported by the frame from a top central position to a second position that is at least 30° from the top central position as it is moved to convey material in a pipe configuration that defines a channel (7h) in which the material (21) being conveyed by the belt (7) is held. The plurality of sensors (31) may be packaged together or separately as part of the upgrade kit, without limitation. In some embodiments, the upgrade kit may comprise one or more slideable connection mechanisms (17) which are configured to be attached between upper frame segments (9e) of the frame (9) and lower frame segments (9f) of the frame (9) to moveably connect the upper frame segments (9e) to the lower frame segments (9f). In some embodiments, the upgrade kit may comprise one or more pivotal connection mechanisms (19) configured to pivotally connect the upper frame segments (9e) to an upper peripheral portion (9m) of the frame.

In some embodiments, the kit may include the sensors (31), the slideable connection mechanisms (17) and the pivotal connection mechanisms (19), without limitation. In some embodiments, the kit may be broken into kit components and may include one or more sensors (31) in a kit component. In some embodiments, a kit component may include one or more slideable connection mechanisms (17) for retrofit or replacing worn slideable connection mechanisms (17). In some embodiments, a kit component may include one or more pivotal connection mechanisms (19), without limitation. Kit components of the upgrade kit may be provided together or separately in various numbers and/or combinations, to successfully convert an existing conveyor apparatus according to the teachings of this disclosure, or maintain a conveyor apparatus employing the inventive concepts disclosed herein (including those conveyor apparatus which have been converted via retrofit according to the teachings of this disclosure).

In some embodiments, an upgrade kit may comprise a controller (11) configured to communicate with the sensors (31)—for example, for communicating with at least one sensor (31)—such as least two sensors (31), without limitation. In some embodiments, the upgrade kit may include the sensors (31) and that the controller (11) may be bundled with one or more of the sensors (31), or provided separately as kit components, without limitation.

Other details, objects, and advantages of the conveyor apparatus, conveyor control mechanism, upgrade kit for conveyor apparatuses, and methods of making and using the same will become apparent as the following description of certain exemplary embodiments thereof proceeds.

BRIEF DESCRIPTION OF THE DRAWINGS

Exemplary embodiments of the conveyor apparatus, conveyor control mechanism, and methods of making and using the same are shown in the accompanying drawings. It should be understood that like reference numbers used in the drawings may identify like components.

DETAILED DESCRIPTION OF EXEMPLARY EMBODIMENTS

Figure 1:
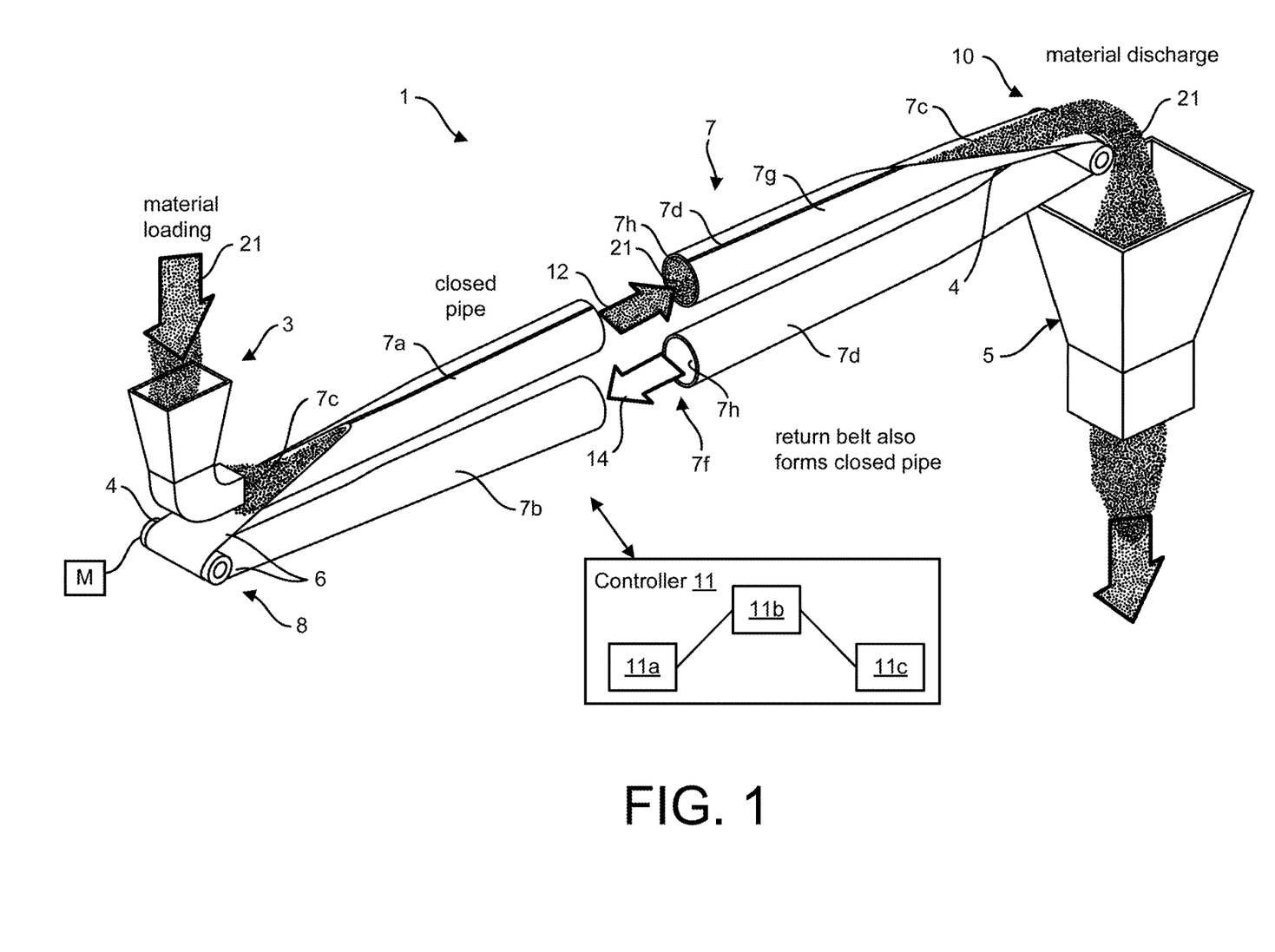
FIG. 1 is schematic view of a first exemplary embodiment of conveyor apparatus with the frame that supports the conveyor belt removed.
Figure 2:
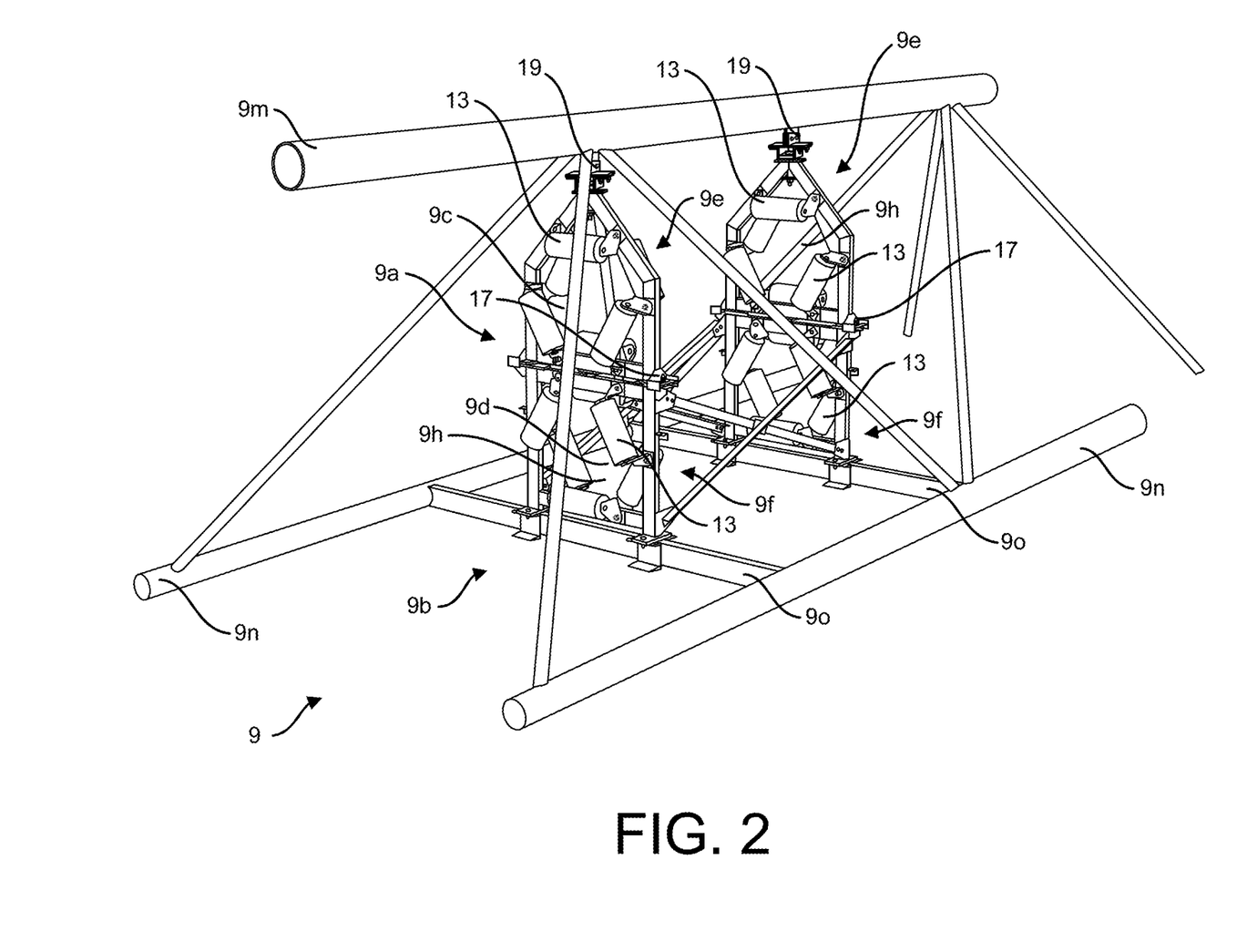
FIG. 2 is fragmentary perspective view of the first exemplary embodiment of the conveyor apparatus with the conveyor belt removed to illustrate the frame of the apparatus.
Figure 3:
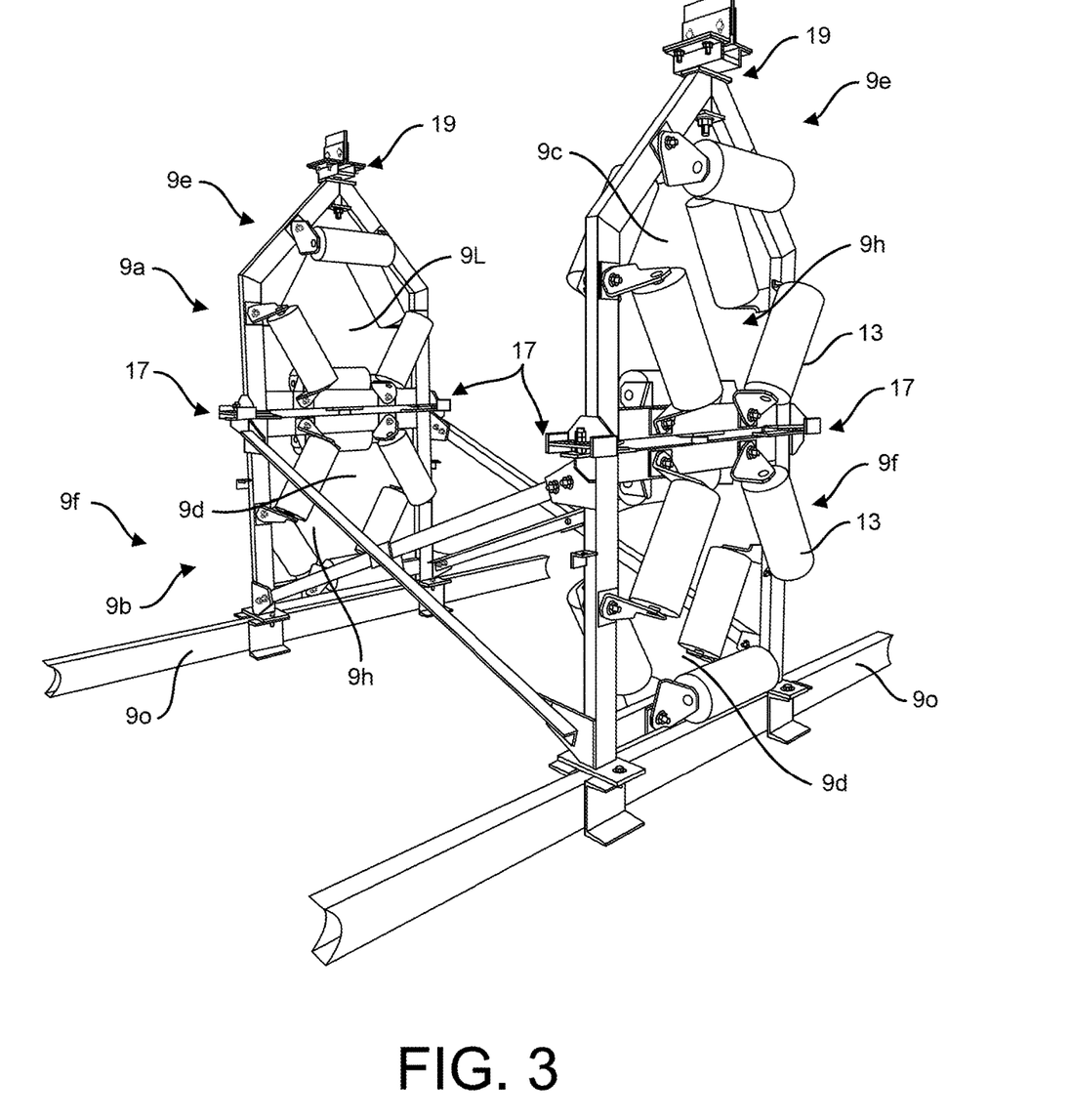
FIG. 3 is a fragmentary perspective view of the first exemplary embodiment of the conveyor apparatus with the conveyor belt removed to illustrate the frame of the apparatus.
Figure 4:
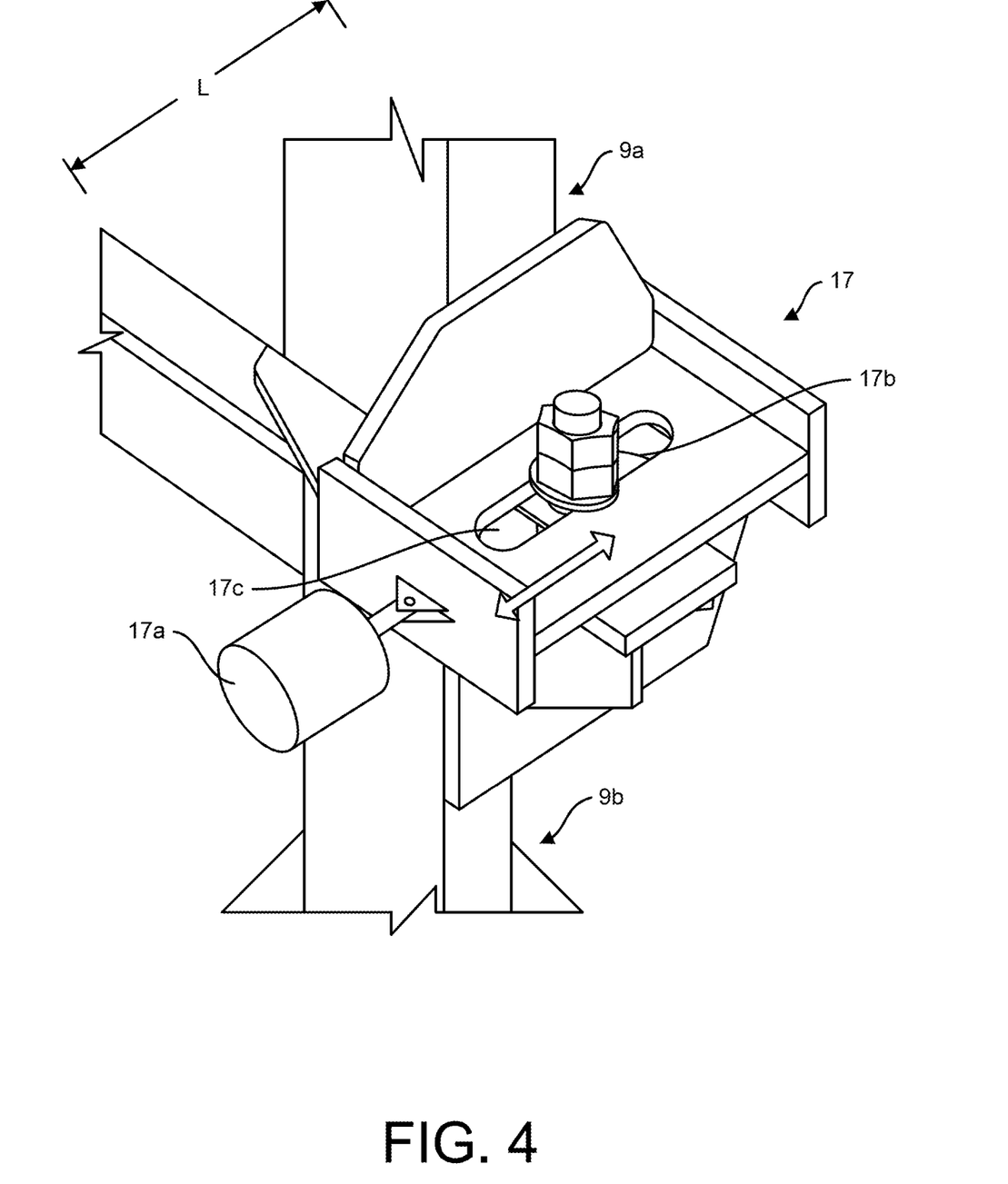
FIG. 4 is an enlarged fragmentary view of the first exemplary embodiment that illustrates a first exemplary upper rotational adjustment mechanism included in the upper frame portion of the first exemplary embodiment of conveyor apparatus.
Figure 5:
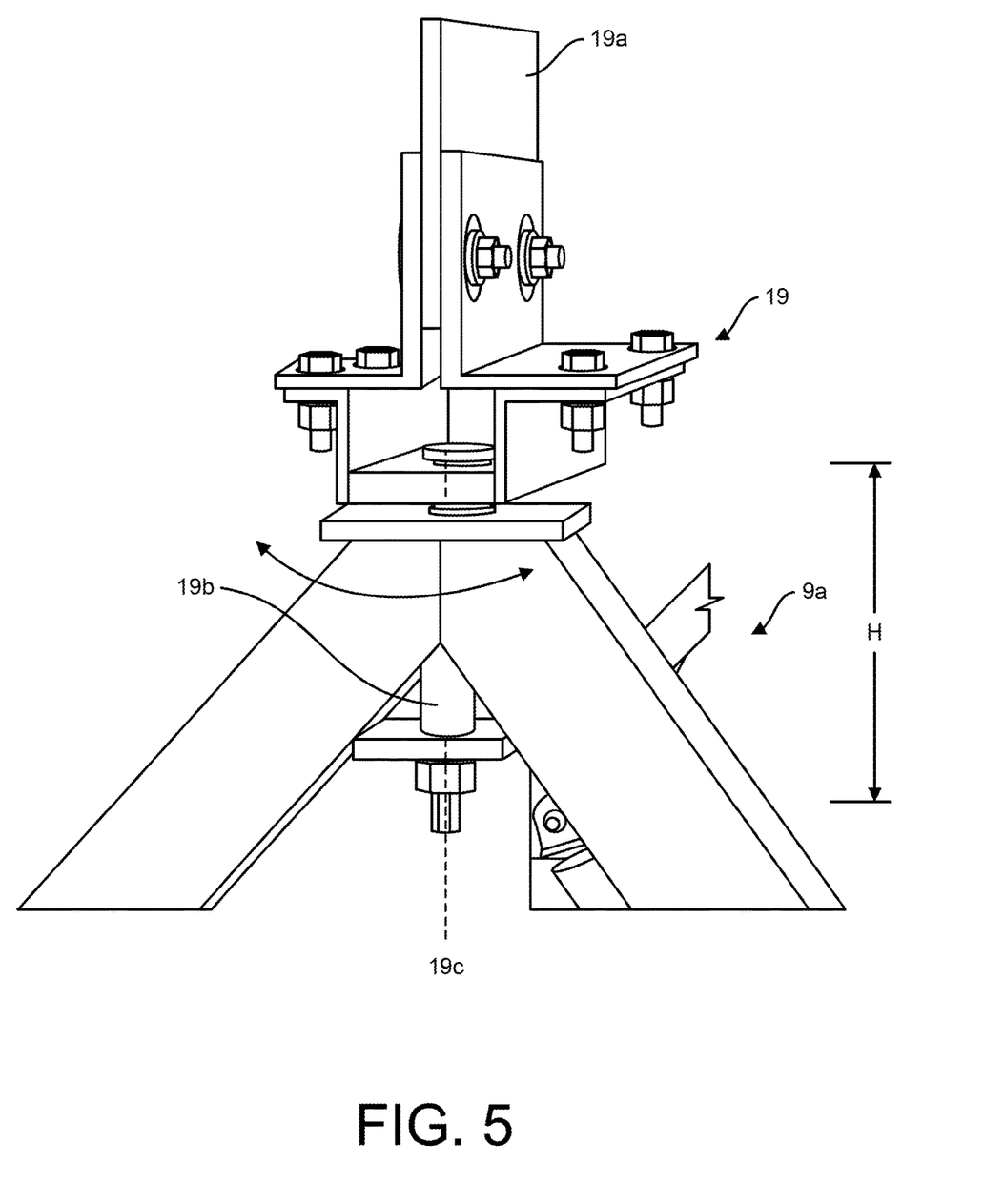
FIG. 5 is an enlarged fragmentary view of the first exemplary embodiment that illustrates a first exemplary side rotational adjustment mechanism included in the upper frame portion of the first exemplary embodiment of conveyor apparatus.
Figure 6:
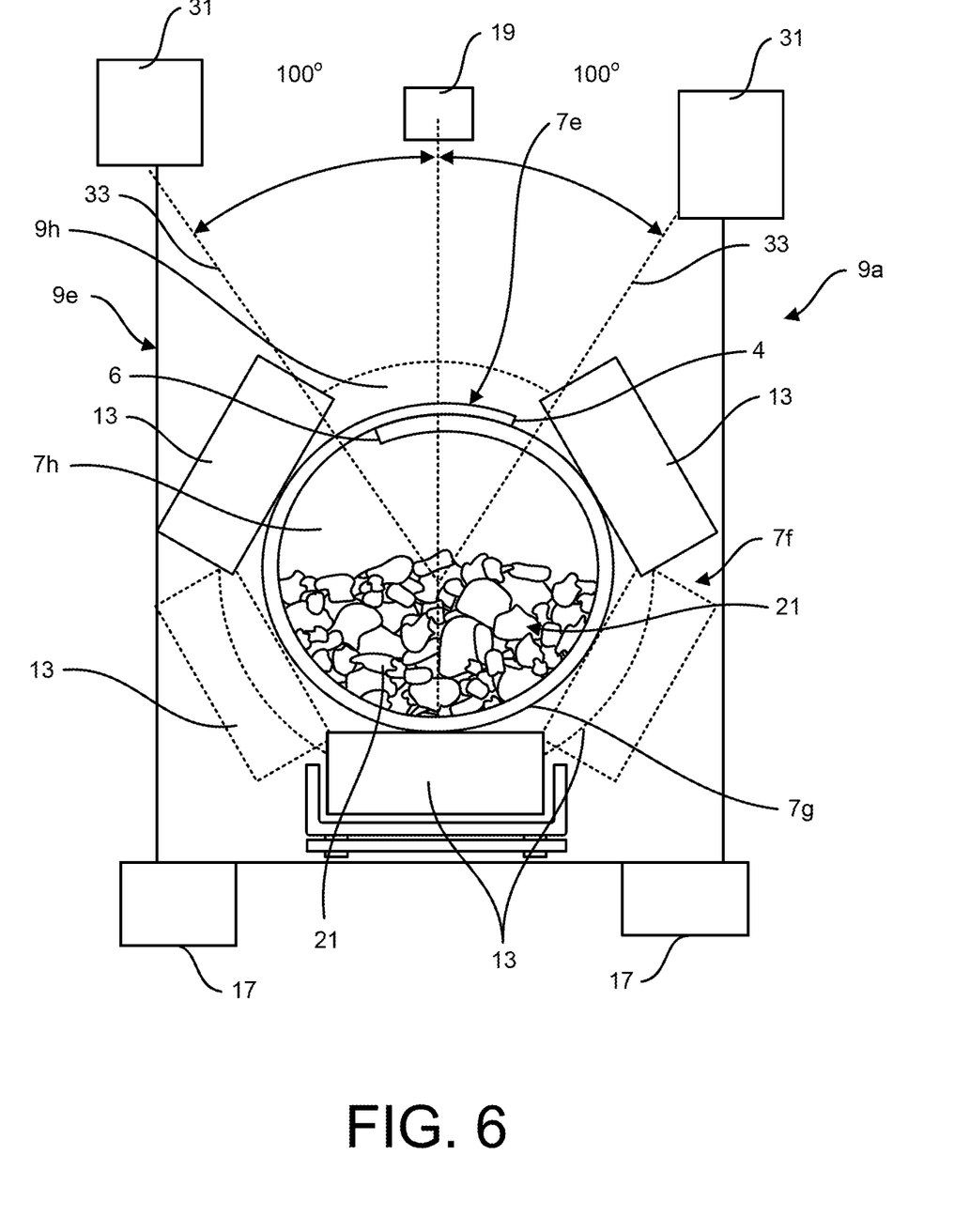
FIG. 6 is a cross sectional schematic view of the upper run of the conveyor belt and the upper portion of the frame of the first exemplary embodiment of conveyor apparatus in which material is transported via a pipe conveyor belt configuration of that upper run of the conveyor belt.
Figure 7:
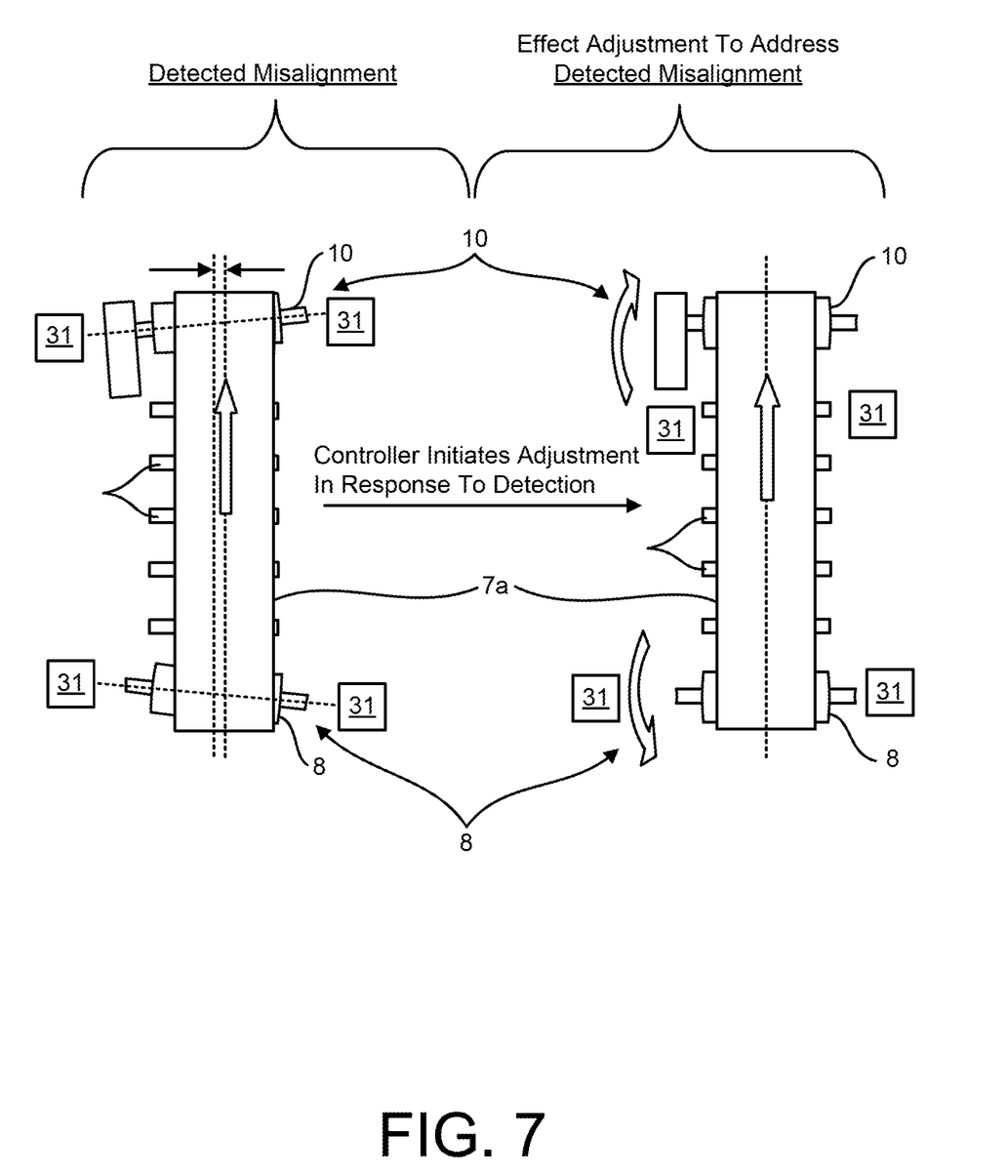
FIG. 7 is a schematic flow chart illustrating an exemplary process in which conveyor belt operation is automatically adjustable via monitoring of the conveyor belt of the first exemplary embodiment of conveyor apparatus.
Figure 8:
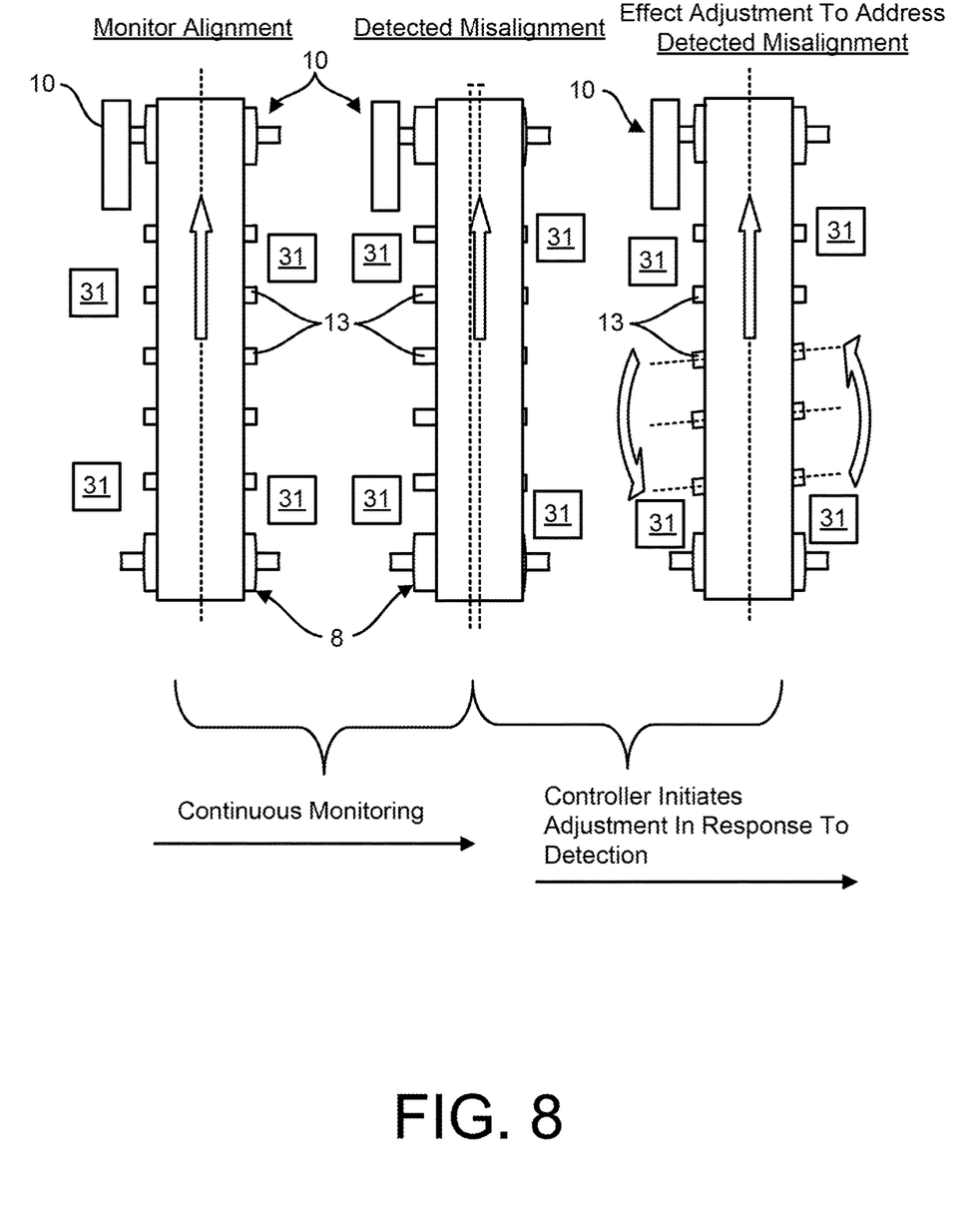
FIG. 8 is a schematic flow chart illustrating an exemplary process in which conveyor belt operation is automatically adjustable via monitoring of the conveyor belt of the first exemplary embodiment of conveyor apparatus.

As can be appreciated from FIGS. 1-8, a conveyor apparatus 1 can includes a belt 7 that extends between material loading device 3 to a material discharge device 5. The belt can be configured as a continuous belt and include an upper material transport run 7a that extends between the material loading device 3 and the material discharge device 5 and a lower return belt run 7b that extends between the material loading device 3 and the material discharge device 5. The material loading device 3 can be configured as (and/or include) a hopper, guide, or other feed element or feed conduit that can deliver material to be conveyed to the belt 7. The material can be received from a comminution device or from a truck or other vehicle that may deliver the material to the material loading device 3 or a conduit connected to the material loading device 3.

The material discharge device 5 can include a hopper that receives material from a discharge end of the conveyor belt's upper run 7a. The material may be conveyed off the belt 7 and into the material discharge device as the belt 7 moves around a fixed pulley defining the discharge end of the belt 7 to reverse directions from moving in a first direction 12 (e.g. a forward direction or rearward direction) in which the upper run 7a of the belt moves from the material loading device 3 to the material discharge device 5 to a second direction 14 (e.g. a forward direction or rearward direction that is opposite the first direction 12) in which the lower run 7b of the belt 7 moves from the material discharge device 5 to the material loading device 3.

The belt 7 can be supported by a frame 9. The frame can be structured to extend from the ground or a support structure installed on the ground or supported on the ground to support the belt 7 in an elevated position that is above the ground. The frame 9 can be configured to support the belt so that the upper and lower runs 7a and 7b each have end sections 7c in which the belt is flat and extends horizontally from a first side 4 to a second side 6. The first and second sides 4 and 6 can be located between the material receiving end of the belt 7 and the material discharge end of the belt. The material receiving end of the belt 7 can include a portion of the belt that extends from the lower run 7b to the upper run 7a by curving, or bending, around a first pulley 8 positioned to define the material receiving end of the belt 7. The material discharge end of the belt can include a portion of the belt that extends from the upper run 7a to the lower run 7b by curving, or bending, around a second pulley 10 positioned to define the material discharge end of the belt 7. The material discharge end of the belt moves about its discharge end so that it changes directions as it moves along the second pulley 10 from moving in the first direction 12 (toward the material discharge device 5) to moving in the second direction 14 (toward the material loading device 3). The material loading end of the belt also changes directions as it moves along the first pulley 8 from moving in the second direction 14 to moving in the first direction 12. During the reversal of directions that occurs at the material loading end of the belt as the belt 7 curves or bends around the first pulley 8, the belt 7 can move vertically upwardly from the lower run 7b to the upper run 7a. During the reversal of directions that occurs at the material discharge end of the belt, the belt can move vertically downwardly during its motion around the second pulley 10 as the belt 7 passes from the upper run 7a to the lower run 7b. A motor M (as indicated in broken line in FIG. 1) can be connected to the first pulley 8 or to the second pulley 10 to drive rotation of the pulley to which the motor M is coupled for driving motion of the belt 7.

The frame 9 can also support the belt so that the middle segment 7d of the upper run 7a that is between the end sections 7c of the upper run 7a of the belt 7 defines a closed pipe (e.g. is curved into an annular-type shape to form a pipe-like structure or tubular structure between the end sections 7c) for conveying material within a channel 7h defined inside the belt 7. The channel 7h can have a diameter that defines its width. Material 21 can be conveyed within the channel when the belt is moved into its closed pipe shape. The pipe shape of the belt can be formed by opposite side edges of the belt (e.g. the edges of the first and second sides 4 and 6) overlapping each other at an overlap portion 7e to define the annular structure 7f of the belt of the middle segment 7d of the upper run 7a so that material 21 to be conveyed via the belt is enclosed within an inner channel 7h defined by the tubular shaped middle segment 7d. The frame 9 can also support the belt so that the middle segment 7d of the lower run 7b that is between the end sections 7c of the lower run 7b a is curved into a circular-type shape to form a pipe or tubular structure between the end sections 7c that define an inner channel 7h. Opposite side edges of the belt 7 may overlap at the overlap portion 7e to define the pipe structure of the middle segment 7d of the upper run 7a of the belt (e.g. the annular or tubular structure defining channel 7h).

A controller 11 can be connected to a motor M and other elements of the conveyor apparatus 1 to monitor and/or control operations of the conveyor apparatus. The controller 11 can be configured as a computer device that includes a processor 11b that is communicatively connected to non-transitory memory 11a and at least one transceiver 11c. The controller 11 can be configured to run one or more programs stored in the memory 11a (e.g. flash memory, a hard drive, etc.). The controller can be communicatively connected to a motor M that is connected to at least one of the first pulley 8 and the second pulley 10 that drives rotation of at least one of the first pulley 8 and second pulley 10 for motion of the belt 7. The controller 11 can also be communicatively connected to detector mechanism that are positioned to monitor operational conditions of the belt 7. The monitored conditions that can be monitored or detected during operations can include the speed at which the belt 7 moves, the location of the an overlap portion 7e of the belt 7 that forms the pipe or tubular structure of the middle segments 7d of the belt 7, and/or the rate at which material is being transported from the material loading end of the belt to the material discharge end of the belt. The controller 11 can be communicatively connected to multiple spaced apart sensors 31 for performing this monitoring. At least some of these sensors 31 may be connected to the frame 9 for positioning the sensors to detect conditions relating to the operation and/or motion of the belt 7. The communicative connection can be provided by a communication link that extends along a wired communication path, a wireless communication path, utilizes one or more intermediate nodes (e.g. a network access point or other type of node) or other type of communication path (e.g. a network communication link, a direct wired link, a direct wireless communication link, a communication connection that includes combination of such links, etc.).

The frame 9 that supports the belt 7 of the conveyor apparatus can include an upper belt supporting portion 9a and a lower belt supporting portion 9b. The upper belt supporting portion 9a can be connected to the lower belt supporting portion 9b so that the upper belt supporting portion 9a is positioned above the lower belt supporting portion 9b and is moveable (e.g. rotatable, slideable, and/or pivotable, etc.) relative to the lower belt supporting portion 9b. The upper belt supporting portion 9a and the lower belt supporting portion 9b can each define a central aperture 9h through which the belt 7 is movable when it is in its annular structure and is moving along its middle segments 7d. The upper belt supporting portion 9a can include a number of aligned, spaced apart upper frame segments 9e that are each attached to a plurality of idlers 13 to position those idlers 13 to define first upper central apertures 9c through which the closed, tubular middle segment 7d of the upper run 7a of the belt can pass through such that the idlers 13 can contact the outer, exterior side 7g of the pipe shaped belt 7 as the belt 7 is passed through the first upper central apertures 9c. In some embodiments, each upper frame segment 9e can be configured as an idler panel of the frame 9, for example. The lower belt supporting portion 9b can include a number of aligned, spaced apart lower frame segments 9f that are each attached to a plurality of idlers 13 to position those idlers 13 to define aligned second lower central apertures 9d through which the closed, tubular middle segment 7d of the lower run 7b of the belt can pass through such that the idlers 13 can contact the outer, exterior side 7g of the pipe shaped belt 7 as the belt is passed through the second lower central apertures 9d. In some embodiments, each lower frame segment 9f can be configured as an idler panel of the frame 9, for example.

The frame 9 can also include other structure connected to the upper belt supporting frame portion 9a and/or lower belt supporting frame portion 9b to position the frame within a building or plant and/or position the upper belt supporting frame portion 9a and/or lower belt supporting frame portion 9b above the ground to support the belt 7 above the ground. Posts, cross-beams, concrete slabs, and other structures may be included in the frame 9 or attached to the frame 9 to facilitate such positioning of the upper belt supporting frame portion 9a and/or lower belt supporting frame portion 9b. Such structure can include cross braces that may extend between spaced apart lower frame segments 9f, cross braces that extend around a peripheral frame structure between spaced apart lower frame segments 9f, spaced apart upper frame segments 9e, at least one upper support beam 9m of a peripheral frame structure of the frame 9 that is attached to the spaced apart, inner upper frame segments 9e, lower support beams 9n of an outer peripheral frame structure of the frame 9 attached to the spaced apart, inner lower frame segments 9f, and cross beams 90 that extend between lower support beams 9n.

In some embodiments, the relative motion of the upper belt supporting frame portion 9a relative to the lower belt supporting frame portion 9b can be provided be at least one of: (i) use of slideable connection mechanisms 17 that connect upper frame segments 9e to lower frame segments 9f so that each upper frame segment 9e is moveably attached to a respective lower frame segment 9f via slideable connection mechanisms 17, (ii) upper pivotal connection mechanisms 19 that are each attached to a respective upper frame segment 9e so that the upper frame segment 9e is pivotally connected to a peripheral frame structure (e.g. upper beam 9m) of the frame 9, and (iii) the combination of slideable connection mechanisms 17 and pivotal connection mechanisms 19. In some embodiments, there can be at least two slidable connection mechanisms 17 that attach an upper frame segment 9e to a lower frame segment 9f at opposite sides of the frame segments, as shown for example in FIGS. 2 and 3. The slidable connection mechanisms 17 can be positioned on each and every pair of upper frame segments 9e and lower frame segments 9f or can only be utilized in some of these connected together segments. The pivotal connection mechanisms 19 can be positioned on each and every one of the upper frame segments 9e or can only be positioned on some of the upper frame segments 9e at spaced apart locations located between the first and second pulleys 8 and 10.

Each slideable connection mechanism 17 can include an assembly that includes at least one pin 17b (e.g. a bolt, a rod, a bar, a fastener, a member, a rigid element, etc.) that extends from the lower frame segment 9f through a slot 17c defined in a body attached to the upper frame segment 9e. The pin 17b can extend from the lower frame segment 9f through the slot 17c. In other embodiments, the pin 17b can extend from the upper frame segment 9e to the lower frame segment 9f and the slot 17c can be defined in a body attached to the lower frame segment 9f such that the upper frame segment 9e is moveable relative to the lower frame segment 9f.

One or more retainers (e.g. one or more nuts, a cap, etc.) can be attached to a distal end of the pin 17b (e.g. an upper end of a pin that extends from the lower frame segment 9f or a lower end of the pin that extends from an upper frame segment 9e) to keep the pin retained within the slot 17c so that the body that defines the slot 17c is slideable relative to the pin 17b and lower frame segment 9f from which the pin extends from the first end of the slot to the opposite second end of the slot 17c such that the length L of the slot 17c can define the path of motion. In other embodiments where the pin extends from the upper frame segments 9e, the retainer can be connected to the distal end of the pin so that the pin is moveable within the slot 17c relative to the lower frame segment 9f and body defining the slot 17c.

An actuator 17a can be configured as a hydraulic cylinder or other type of actuator. The actuator 17a can be configured to move the upper frame segment 9e so that the body that defines the slot 17c to which the upper frame segment is attached or the pin 17b to which the upper frame segment is attached moves to drive motion of the upper frame segment 9e relative to the lower frame segment 9f along a path of travel defined by the length L of the slots 17c through which pins 17b extend. In some embodiments, the actuator 17a can be connected to the frame 9 so that an extendable arm of the actuator extends from an outer frame element to the upper frame segment 9e to drive motion of the upper frame segment via the pins 17b and slots 17c of the slideable connection mechanisms 17 that moveably attach the upper frame segment 9e to the lower frame segment 9f. In some embodiments, there may be a single actuator that is attached to an upper frame segment for motion of the upper frame segment 9e relative to the lower frame segment 9f about two or more slideable connection mechanisms 17. In other embodiments, there may be an actuator 17a connected to a respective slideable connection mechanism 17 at each side of a moveable upper frame/lower frame segment connection that can be actuated to drive motion of the upper frame segment 9e relative to the lower frame segment 9f to which it is moveably attached via slideable connection mechanisms 17.

The upper frame segments 9e can also be pivotally connected to a top element, or an upper external element of the frame 9 via a pivotal connection mechanism 19. Each upper frame segment 9e can include such a connection or a plurality of spaced apart upper frame segments (but not all upper frame segments 9e) can include such pivotal connections. In some embodiments, each pivotal connection can include a pivotal connection mechanism 19 that connects a peripheral upper beam 19m of the frame (e.g. a top beam that is at a periphery of the frame or is at least more outwardly positioned than the inner upper frame segment 9e) to the upper frame segments 9e. The pivotal connection mechanism 19 between the upper beam 19m and the upper frame segment 9e can be configured so that the upper frame segment 9e is rotatable relative to the lower frame segment 9e and relative to the top beam 19m. In other embodiments, the pivotal connection of the upper frame segment 9e can be to a different frame element that is positioned above the upper frame segment, but is not a top beam (e.g. an upper cross beam or an upper frame element that is positioned outside of the upper frame segment 9e and above the upper frame segment 9e, etc.).

Each pivotal connection mechanism 19 can include an upper assembly 19a that is attached to the top beam 19m or other upper frame segment 9e of the frame 9. An elongated member 19b can extend along its height H from the upper assembly 19a through a portion of the upper frame segment 9e. For example, the upper frame segment 9e can include an upper body that defines a hole through which the elongated member 19b extends and is configured to facilitate rotation of the upper frame segment 9e about the axle defined by the elongated member 19b positioned in that hole. The height H of the elongated member 19b can define a vertical axis 19c about which the upper frame segment 19e is rotatable. Such rotation of the upper frame segment 19e can permit horizontal rotational movement of the upper frame segment about the vertical axis 19c relative to the upper beam to which it is attached and the lower frame segment 9f to which it is attached. This rotational motion can occur when the arms of one or more actuators 17a are moved to slide the upper frame segment 9e relative to the lower frame segment 9f via the slideable connection mechanisms 17 connecting the lower frame segment 9f to the upper frame segment 9e.

The conveyor apparatus 1 can also include a plurality of spaced apart sensors 31. The sensors 31 can be configured as laser sensors that can be mounted on both sides of the belt 7 near upper frame segments 9e that support idlers 13 and/or the first pulley 8 and second pulley 10. The laser sensors can monitor rotation of the overlap portion 7e of the middle segment 7d of the upper run 7a of the belt 7 as the belt moves (e.g. can monitor conveyor pipe rotation for the middle segment 7d of the upper run 7a). The sensors 31 can also be positioned to monitor rotation of the overlap portion 7e of the middle segment 7d of the lower run 7b of the belt 7 as the belt moves (e.g. can monitor conveyor pipe rotation for the middle segments 7d of the lower run 7b). These sensors 31 can be positioned so that they can monitor rotation of the overlap portion 7e of the belt 7 in either direction (clockwise or counterclockwise) between a specified range (+/−30° to +/−100°, +/−30°, +/−45°, +/−60°, +/−90°, +/−95° etc.). The sensors 31 can be configured to continuously monitor the belt as it is moving to convey material and, if there is pipe rotation, detect the belt overlap portion 7e when it comes within a pre-selected safety rotational range (e.g. a pre-selected rotational threshold being met). Upon such a detection, the sensors can communicate with the controller 11 or an output device to emit at least one warning. The warnings can include a first notification warning that provides an audible and/or a visual warning for a human operator to take notice of the detected condition defined by a first pre-selected rotational threshold (e.g. +/−15°, +/−30°, etc.), a subsequent second warning defined by a second pre-selected rotational threshold (e.g. +/−20°, +/−45°, etc.) for operation personnel to take corrective action when the second pre-selected rotational threshold is met, and finally a third warning defined by a third pre-selected rotational threshold (e.g. +/−30°, +/−60°, +/−90°, +/−100°, etc.) to trip automatic action to ensure operations personnel take corrective action in order to minimize damage so that a major break down of the belt 7 or conveyor apparatus can be avoided upon the third pre-selected rotational threshold being met or exceeded.

The sensors 31 can be configured as belt alignment detectors for a belt alignment detection mechanism that is communicatively connected to the controller 11. For example, a pair of spaced apart sensors 31 can be attached to the frame 9 adjacent to the upper frame segments 9e, to the upper frame segments 9e, or otherwise positioned near the upper frame segments 9e so that each sensor of the pair of sensors is adjacent opposite sides of the frame segment to which the pair of sensors is attached and/or adjacent. Such pairs of sensors 31 can also be positioned adjacent the lower frame segments 9f or by the lower frame segments 9f on opposite sides of the frame segments. There may be one or more pairs of sensors 31 attached adjacent to each upper frame segment 9e and a pair of spaced apart sensors 31 attached to each lower frame segment 9f. In other embodiments, there may be pairs of sensors 31 or more than two sensors 31 positioned adjacent to at least some of the upper frame segments 9e for monitoring the middle segment 7d of the upper run 7a of the belt. There may also be pairs of sensors (or more than two sensors 31) positioned adjacent to at least some of the lower frame segments 9f for monitoring the middle segment 7d of the lower run 7b of the belt.

The overlap portion 7e of the belt 7 when the belt is in an annular structure configuration (e.g. a tubular or pipe configuration) is desired to be maintained at an upper middle location of the belt to avoid material 21 falling out of the channel 7h defined via the annular structure of the belt 7. The most preferred position for the overlap portion 7e is a top central position as shown, for example, in FIG. 6. But, during operation, the belt 7 can rotate so that the overlap portion 7e is rotated from this central top position in a clockwise direction an can also rotate in a counterclockwise direction.

The sensors 31 can be configured to monitor a position of the overlap portion 7e of the belt 7 when the belt defines an annular structure having the channel 7h in which material 21 is transportable. The spaced apart sensors 31 can be positioned so that, for each frame segment to which the sensors are adjacent, there is a first sensor 31 adjacent a first side of the frame segment and a second sensor adjacent a second side of the frame segment that is opposite the first side (e.g. there is at least one sensor 31 on a right side of the belt 7 and a right side of the frame segment and a second sensor 31 on a left side of the belt 7 and a left side of the frame segment, etc.). Each sensor 31 can be configured to emit a detection signal 33 (e.g. a laser beam, beam of visible light, beam of infrared light, etc., a radio signal, or emit other media) to sense a position of the overlap portion 7e of the belt). In some embodiments, a pair of spaced apart sensors 31 can be mounted to the frame 9 or otherwise positioned adjacent an upper frame segment 9e so that the sensors are above the top of the overlap portion 7e of the middle segment 7d of the upper run 7a of the belt 7 and emit a detection signal 33 at the belt at an angle. Each sensor 31 can provide a detection of up to 100° of rotation of the overlap portion 7e from its top central position so that the spaced apart sensors 31 can detect a rotation of the overlap portion 7e from a central top position to a position that is rotated between a range of +/−100° relative to this central top position of the overlap portion 7e (e.g. a range of up to 100° rotation that is counterclockwise from the central top position to a rotation of up to 100° rotation that is in a clockwise direction from the central top position). Upon a detection by one of the sensors 31 or both of the sensors 31 that the overlap portion has rotated away from the top central position to a position that exceeds a pre-selected rotational threshold that defines a motion of the overlap portion 7e that is too far away from the desired top central position (e.g. a rotation of 100°, 60°, 45°, 30°, or 20°, etc. away from the top central position), the data of the sensors can be used by the controller 11 to detect this condition and emit a warning or alarm for actuation of a change in operations to move the overlap portion toward its top central position and/or automatically communicate with actuators 17a and/or motor M to adjust operation of the conveyor apparatus 1 to effect a change in the belt motion to move the overlap portion 7e back toward the top central position or take other corrective action that may be needed due to the detected position of the overlap portion 7e.

Of course, instead of a pair of sensors, three or more sensors could be used or just one sensor 31 could be used adjacent different frame segments to provide a different range of detection for the overlap portion 7e of the belt 7 when the belt is in its annular configuration (e.g. pipe or tubular configuration) that defines channel 7h. But, for many applications, a range of +/−100° rotation will be sufficient for detection purposes. In some embodiments, a smaller range (e.g. +/−30° or +/−45° or +/−60°) may be desired to emit a warning or alarm for actuation of a change in operations to move the overlap portion toward its top central position.

One consideration that can be made in selecting the one or more pre-selected rotational thresholds that can define a motion of the overlap portion 7e that is considered to be too far away from the desired top central position is false alarms in which the rotational tolerance for the overlap portion 7e is so narrow that the belt operation is almost always being adjusted. Such a tight tolerance is undesirable as it can require changes to conveyor apparatus operations too often, which can detrimentally affect the efficient operation of the belt 7. A pre-selected rotational threshold is therefore most preferably selected to be a 30°, 45°, 60°, 75°, or 90° threshold (e.g. not less than 30° and not more than 100°) so that any clockwise or counterclockwise rotation from the top central position that is at or beyond this threshold value triggers an alarm and/or an automatic adjustment of conveyor apparatus 1 to adjust the operation of the belt 7 to move the overlap portion 7e back to the top central position or toward a position within the pre-selected rotational threshold of that top central position.

The controller 11 can be configured to communicate with the sensors 31 to receive measurement data from the sensors or detection data from the sensors that relate to the location of the overlap portion 7e of the middle segments 7d of the belt 7 as the belt 7 is moved for conveying material 21. The controller 11 can be configured to use this received sensor data from the sensors 31 to determine when the overlap portion has rotated too far away from the top central location. The controller can also be configured (or alternatively be configured) to receive sensor data from one or more of the sensors 31 indicating that the overlap portion 7e has rotated too far away from the top central location. Upon the controller 11 determining from the sensor data received from the sensors 31 that the overlap portion 7e of the belt 7 is rotated too far away from the desired top central position (e.g. being at or exceeding the pre-selected rotational threshold via clockwise rotation or via counterclockwise rotation), the controller can communicate a signal or other data for emitting a warning (e.g. a visible warning that may be displayed on a display device communicatively connected to the controller 11 for display to a user or operator, an emission of an audible warning via a speaker communicatively connected to the controller, an emission of a flashing light via a light that is connected to the controller, combinations thereof, etc.) In addition, or as an alternative, the controller 11 can be configured to communicate with at least one actuator 17a, the motor M, and other belt motion movement mechanism (e.g. a first pulley adjustment device configured to adjust a position or motion of the first pulley 8, a second pulley adjustment device configured to adjust a position or motion of the second pulley 10) for adjusting operation of the conveyor belt.

For example, upon a detection of the overlap portion 7e being at an undesired location via the received sensor data, the controller 11 can communicate with multiple actuators 17a to move different upper frame segments 9e relative to lower frame segments 9f to which those upper frame segments 9e are attached via the slideable connection mechanisms 17 and pivotal connection mechanisms 19 for rotating the positions of the first and second pulleys 8 and 10. Via actuation of the actuators 17a, the upper frame segments 9e may be slid linearly relative to the lower frame segments 9f via the slideable connection mechanisms 17 (e.g. slid left to right or right to left, or front to back, or back to front, etc.). The pivotal connection mechanisms 19 can rotate during such linear motion of driven via the actuator(s) 17a so that the upper frame segments 9e rotate about vertical axes as they are slid linearly and/or horizontally (e.g. rotate counterclockwise or clockwise as they are moved linearly or horizontally left to right or right to left, or front to back or back to front, etc.). For example, upon detection that the overlap portion 7e has rotated too far in a counterclockwise direction, the controller 11 can communicate with actuators 17a to move a first upper frame segment 9e that supports the first pulley 8 so that the upper frame segment rotates via slidable connection mechanisms 17 and pivotal connection mechanism 19 in a first rotational direction and so that a second upper frame segment 9e that supports the second pulley 10 rotates in a second rotational direction that is opposite this first rotation direction to induce a rotation of the overlap portion 7e in a clockwise direction toward its top central position as the belt continues to move to convey material 21. Depending on the direction at which the upper run 7a of belt is moving to convey material 21 (e.g. forwardly or rearwardly, etc.), the actuated rotation of the first and second upper frame segments can be different such that a first actuator is actuated via the controller 11 to move the first upper frame segment 9e that supports the first pulley 8 so that the upper frame segment rotates via slidable connection mechanisms 17 and pivotal connection mechanism 19 in the second rotational direction and so that the second upper frame segment 9e that supports the second pulley 10 rotates in the first rotation direction to induce a clockwise rotation of the overlap portion 7e toward its top central position as the belt 7 continues to move.

The controller 11 can also be configured to actuate actuators in a similar fashion upon detection that the overlap portion 7e of the middle segment 7d of a run of the belt has rotated too far in a clockwise direction. Depending on the direction at which the belt is moved to convey material 21, such actuation of motion can include either: (i) actuators 17a moving the first upper frame segment 9e that supports the first pulley 8 so that the upper frame segment rotates via slidable connection mechanisms 17 and pivotal connection mechanism 19 in the first rotational direction and so that the second upper frame segment 9e that supports the second pulley 10 rotates in the second rotational direction that is opposite this first rotation direction to induce a counterclockwise rotation of the overlap portion 7e toward its top central position as the belt 7 is moved to convey material or (ii) actuators 17a moving the first upper frame segment 9e that supports the first pulley 8 so that the upper frame segment rotates via slidable connection mechanisms 17 and pivotal connection mechanism 19 in the second rotational direction and so that the second upper frame segment 9e that supports the second pulley 10 rotates in the first rotational direction to induce a counterclockwise rotation of the overlap portion 7e toward its top central position as the belt 7 is moved to convey material.

The controller 11 can also be configured to move other upper frame segments 9e instead of upper frame segments that support the first and second pulleys 8 and 10 or at the same time the frame segments that support the first and second pulleys 8 and 10 are moved. For instance, the controller 11 can determined that the overlap portion 7e of the upper run 7a of the belt in the middle segment 7d has rotated too far in a clockwise direction. Depending on the direction at which the upper run 7a of the belt 7 is moved to convey material 21, such actuation of motion can include either: (i) actuators 17a moving the first upstream upper frame segment 9e that supports a first set of upstream idlers 13 so that the upstream upper frame segments rotate via slidable connection mechanisms 17 and pivotal connection mechanism 19 in the first rotational direction and so that a set of second downstream upper frame segment 9e that are downstream of the first set of upstream upper frame segments 9e and supports downstream idlers 13 rotate in the second rotational direction that is opposite this first rotation direction to induce a counterclockwise rotation of the overlap portion 7e toward its top central position as the belt 7 is moved to convey material or (ii) actuators 17a moving the first set of upstream upper frame segments 9e that support upstream idlers so that the first set of upstream upper frame segments rotate via slidable connection mechanisms 17 and pivotal connection mechanism 19 in the second rotational direction and so that the second downstream upper frame segments 9e that support the downstream idlers 13 rotate in the first rotational direction to induce a counterclockwise rotation of the overlap portion 7e toward its top central position as the belt 7 is moved to convey material. Depending on the direction at which the upper run 7a of the belt 7 is moved to convey material 21, the controller 11 can be configured to also actuate motion of upper frame segments in response to a determination that the overlap portion 7e is rotated too far in a counterclockwise direction such actuation of motion can also include either: (i) actuators 17a moving the first upstream upper frame segments 9e that support a first set of upstream idlers 13 so that the upper frame segments rotate via slidable connection mechanisms 17 and pivotal connection mechanisms 19 in the first rotational direction and so that a set of second downstream upper frame segment 9e that are downstream of the first set of upstream upper frame segments 9e and support downstream idlers 13 rotate in the second rotational direction that is opposite this first rotation direction to induce a clockwise rotation of the overlap portion 7e toward its top central position as the belt 7 is moved to convey material or (ii) actuators 17a moving the first set of upstream upper frame segment 9e that support upstream idlers 13 so that the first set of upstream upper frame segments rotate via slidable connection mechanisms 17 and pivotal connection mechanisms 19 in the second rotational direction and so that the second downstream upper frame segment 9e that supports the downstream idlers 13 rotate in the first rotational direction to induce a clockwise rotation of the overlap portion 7e toward its top central position as the belt 7 is moved to convey material.

The adjustments that can be made via the controller 11 can occur automatically upon a detection of the overlap portion 7e rotating beyond a pre-selected rotational threshold as discussed herein. Examples of the adjustable actuation that can be provided in response to the sensor data received via the sensors 31 may best be appreciated from FIGS. 7 and 8 in which the second pulley 10 can be considered a take-up pulley. As the belt 7 is moving under load to convey material 21, the belt 7 can be monitored via sensors 31. Over time, during operation of the belt for conveying material, the overlap portion 7e of the middle segment 7d of the upper run 7a of the belt may rotate away from its top central position. As such rotation of the overlap portion 7e occurs, the belt 7 may no longer travel centrally when moving toward the second pulley 10 to convey material to the discharge end of the belt. As a result of this motion, the sensors may detect that the position of the second pulley 10 relative to the center of the belt 7 exceeds or is below a pre-selected threshold value, such as, for example, 90°. Such a detection can occur by detecting the overlap portion 7e being rotated too far away from its top central position. In response to such a determination, the controller 11 can communicate with the actuators 17 to drive motion of the upper frame segments 9e relative to the lower frame segments 9f to adjust the belt 7 as it is moved to induce rotation of the belt for better aligning the overlap portion toward its desired top central location in the middle segment of the upper run 7a of the belt 7 as the belt is moved.

The corrective action effected via the controller 11 can be configured to occur in discrete steps or at the same time. In some embodiments, the controller can communicate with different actuators 17a so that all upper frame segments 9e to be moved are moved at the same time (e.g. simultaneously). In other embodiments, the controller can communicate with the actuators so that different upper frame segments are moved at different times. For example, the controller 11 can first actuate motion of upper frame segments 9e that support the first and second pulleys 8 and 10 in order to realign the belt 7 with the center of these pulleys. After the adjustment of those frame segments occur, the controller 11 can communicate with other actuators to actuate motion of upper frame segments 9e that support idlers 13 to further induce alignment of the belt centrally. Adjustment of the upper frame segments that support idlers 13 can adjust the positions of the idlers to provide an aligning impact on the belt to rotate the overlap portion 7e toward its top central location by causing a transverse shifting of the belt 7 as it moves to rotate the belt so that the overlap portion 7e is moved back toward the top central location.

The adjustment of the conveyor belt 7 can be actuated herein via input provided by a user in response to a warning communicated via the sensors 31 and/or controller 11. For example, the warnings can include a first notification warning that provides an audible and/or a visual warning for a human operator to take notice of the detected condition. The human operator may respond to such a first warning by paying more attention to a detected condition or by actuating one or more actuators to address the identified issue. A subsequent second warning can also be communicated via the sensors 31 and/or controller 11 for operation personnel to indicate to a human operator that input data should be provided to the controller 11 to initiate actuation of actuators 17a so that corrective action is taken for moving the upper frame segments 9e. A third warning can subsequently be issued to trip automatic action via the controller 11 to ensure corrective action is taken (via adjustment of upper frame segments or belt motion shutdown) in order to minimize damage so that a major break down of the belt 7 or conveyor apparatus can be avoided. The different warnings can each correspond to a different pre-selected threshold being met. Thus, the controller can utilize more than one pre-selected rational threshold. For example, the first warning can be issued in response to a detection of a 30° threshold being met, the second warning can be issued in response to a 45° or 60° rotational threshold being met, and the third warning can be issued in response to a 60° or 90° rotational threshold being met. It should be appreciated that other rotational thresholds values can be used instead of these exemplary values.

It is contemplated that embodiments of the conveyor apparatus 1 and detection mechanism that is includable within the conveyor apparatus will help to avoid many indirect problems like material spillage, belt snap and belt edge damages. It can also be configured to help in achieving improved running conditions and enhance the operational time of the conveyor apparatus as well as reduce operation and maintenance costs thereby improving productivity. Some embodiments of the conveyor apparatus 1 and conveyor apparatuses utilizing embodiments of the detection mechanism can provide an improved safety system for pipe conveyors, which would also improve operational reliability and improve productivity.

Further, the controller 11 can be configured to include an automated training module for pipe conveyor based on feedback from the sensors after the controller 11 effects adjustment of different upper frame segments. Such a module could be stored in the controller's non-transitory memory and run via its processor during operation of the conveyor apparatus. Such a configuration can assist in self-correction of belt rotation which would provide a value addition that would greatly enhance the potential for addressing productivity issues associated with pipe conveyors as well as possibly providing similar improvements for some other types of conveyors.

In addition to providing embodiments of a conveyor apparatus 1, a service provider can provide an upgrade kit for incorporation the detection mechanism and convey belt adjustment mechanism into a pre-existing conventional conveyor apparatus. The update kit can include sensors 31, slideable connection mechanisms 17, pivotal connection mechanisms 19, actuators 17a, and other structures and components that may be needed to facilitate re-configuration or modification of a pre-existing frame of a conveyor to inclusion and use of sensors 31, slideable connection mechanisms 17 and pivotal connection mechanisms 19. The upgrade kit can also include the controller 11 or software for storing in the memory of a pre-existing controller and installing on a pre-existing controller so the controller 11 can be configured to utilize sensor data from sensors, initiate emission of one or more warnings and initiate actuation of any actuators for adjustment of upper frame segments based on the sensor data 31 received from sensors 31.

It should be appreciated that different embodiments of the conveyor apparatus 1 and different embodiments of the upgrade kit and conveyor control mechanism can utilize different arrangements to meet a particular set of design criteria. For instance, the sensors 31 can be any type of laser sensor (e.g. visible light, infrared, etc.) or another type of sensor that can be suitable to meet a particular design objective. As another example, the frame 9, the structure of the pivotal connection mechanisms 19, and the structure of the slideable connection mechanisms 17 can include other shaped components, other sized components, or other configurations to meet a particular design objection. As yet another example, the number and arrangement of the actuators 17a, slideable connection mechanisms included in a frame 9 and pivotal connection mechanisms 19 included in a frame can be any number that may meet a particular set of design criteria.

It should also be appreciated that some components, features, and/or configurations may be described in connection with only one particular embodiment, but these same components, features, and/or configurations can be applied or used with many other embodiments and should be considered applicable to the other embodiments, unless stated otherwise or unless such a component, feature, and/or configuration is technically impossible to use with the other embodiment. Thus, the components, features, and/or configurations of the various embodiments can be combined together in any manner and such combinations are expressly contemplated and disclosed by this statement. Thus, while certain exemplary embodiments of the conveyor apparatus 1, the conveyor control mechanism, and methods of making and using the same have been shown and described above, it is to be distinctly understood that the invention is not limited thereto but may be otherwise variously embodied and practiced within the scope of the following claims.

The invention claimed is:

1. A conveyor apparatus (1) comprising:
a moveable belt (7) supported by a frame (9), the moveable belt (7) being moveable between a material loading end and material discharge end, the moveable belt (7) having an upper run (7a) and a lower run (7b), the movable belt (7) having sides (4,6) that overlap to form an overlap portion (7e) of a middle segment (7d) of the upper run (7a) of the movable belt (7) between the material loading end and the material discharge end;
the frame (9) comprising:
an upper support beam (9m);
lower support beams (9n);
cross beams (9o) that extend between the lower support beams (9n);
upper frame segments (9e) supporting the upper run (7a) and each being connected to a respective lower frame segment (9f), each lower frame segment (9f) being connected to one of the cross beams (9o) and supporting the lower run (7b);
a plurality of sensors (31) connected to the frame (9) adjacent to the upper frame segments (9e) or to the upper frame segments (9e) of the frame (9) to detect a rotation of the overlap portion (7e) of the movable belt (7) from a top central position to a second position that is angularly displaced from the top central position;

slideable connection mechanisms (17) moveably connecting the upper frame segments (9e) to the lower frame segments (9f) allowing relative movement between each upper frame segment (9e) and its respective lower frame segment (9f);

pivotal connection mechanisms (19) pivotally connecting each of the upper frame segments (9e) to the upper support beam (9m) of the frame (9); and at least one actuator (17a) configured to move at least one of the upper frame segments (9e) relative to its respective lower frame segment (9f).

2. The conveyor apparatus of claim 1, comprising:
a controller (11) having non-transitory memory (11b) communicatively connected to a processor (11a), the controller (11) communicatively connected to the sensors (31) to receive sensor data from the sensors (31), the controller configured to determine, from the sensor data, that the overlap portion (7e) of a middle segment (7d) of the upper run (7a) of the movable belt (7) has rotated away from the top central position such that rotation of the overlap portion (7e) meets a first pre-selected rotational threshold.

3. The conveyor apparatus of claim 2, wherein the controller (11) is configured to initiate actuation of the at least one actuator (17a) in response to determining that the overlap portion (7e) has rotated such that the first pre-selected rotational threshold is met or exceeded so that the at least one of the upper frame segments (9e) moves relative to its respective lower frame segment (9f) and the pivotal connection mechanism (19) to induce the overlap portion (7e) to rotate back toward the top central position as the movable belt (7) moves to convey material.

4. The conveyor apparatus of claim 2, wherein the first pre-selected rotational threshold comprises the second position being angularly displaced from the top central position by at least 30° from the top central position.

5. The conveyor apparatus of claim 2, wherein the first pre-selected rotational threshold comprises the second position being angularly displaced from the top central position by at least 30° from the top central position.

6. A frame (9) for a conveyor apparatus (1) comprising:
an upper support beam (9m);
lower support beams (9n);
cross beams (9o) that extend between the lower support beams (9n);
upper frame segments (9e) configured to support an upper run (7a) of a movable belt (7) in a pipe configuration;
lower frame segments (9f) configured to support a lower run (7b) of the movable belt (7) in a pipe configuration;
each of the upper frame segments (9e) being connected to a respective one of the lower frame segments (9f),
each of the lower frame segments (9f) being connected to a respective one of the cross beams (9o);
slideable connection mechanisms (17) moveably connecting the upper frame segments (9e) to the lower frame segments (9f) allowing relative movement between each upper frame segment (9e) and its respective lower frame segment (9f);
pivotal connection mechanisms (19) pivotally connecting each of the upper frame segments (9e) to the upper support beam (9m) of the frame (9); and
at least one actuator (17a) configured to move at least one of the upper frame segments (9e) relative to its respective lower frame segment (9f).

\* \* \* \* \*